(12) United States Patent
Yang et al.

(10) Patent No.: US 8,896,945 B2
(45) Date of Patent: Nov. 25, 2014

(54) BARREL DRIVING MECHANISM AND IMAGE PICKUP DEVICE THEREOF

(75) Inventors: Tsung-Ken Yang, Hemei Township (TW); Hong-Bin Koh, New Taipei (TW)

(73) Assignee: Altek Corporation, Hsinchu (TW)

( * ) Notice: Subject to any disclaimer, the term of this patent is extended or adjusted under 35 U.S.C. 154(b) by 132 days.

(21) Appl. No.: 13/360,351

(22) Filed: Jan. 27, 2012

(65) Prior Publication Data

US 2013/0135761 A1    May 30, 2013

(30) Foreign Application Priority Data

Nov. 24, 2011  (TW) .............................. 100143025 A

(51) Int. Cl.
    *G02B 27/00*    (2006.01)
(52) U.S. Cl.
    USPC .......................................................... 359/823
(58) Field of Classification Search
    CPC ................... G01N 2333/195; G01N 33/6803; G06F 19/18; G06F 19/24; Y10S 128/925; G02B 7/12
    USPC .......................................... 359/819–826, 694
    See application file for complete search history.

(56) References Cited

U.S. PATENT DOCUMENTS

| 7,852,578 B2 * | 12/2010 | Iwasaki .......................... 359/819 |
| 2010/0128365 A1 * | 5/2010 | Li et al. .......................... 359/694 |

FOREIGN PATENT DOCUMENTS

TW    201022756    12/1997

OTHER PUBLICATIONS

Office Action of corresponding TW application, published on Feb. 26, 2014.

* cited by examiner

*Primary Examiner* — Scott J Sugarman
*Assistant Examiner* — Vipin Patel
(74) *Attorney, Agent, or Firm* — Wang Law Firm, Inc.; Li K. Wang; Stephen Hsu

(57) ABSTRACT

A barrel driving mechanism and an image pickup device thereof. The barrel driving mechanism comprises a fixing-barrel, a driving-barrel and a moving-barrel. The fixing-barrel has a first groove with a first stop-position and a first position. The driving-barrel disposed in the fixing-barrel has a second groove with a second stop-position and a second position. The driving-barrel has a first guiding protrusion inserted into the first groove. The moving-barrel disposed in the driving-barrel having a second guiding protrusion is inserted into the second groove. Wherein, the first stop-position to the first position and the second stop-position to the second position are slanted grooves. When the driving-barrel is rotated, the driving-barrel shifts a first axial distance and the moving-barrel shifts a second axial distance. The sum of the first axial distance and the second axial distance equals the total displacement of the moving barrel.

10 Claims, 6 Drawing Sheets

BARREL DRIVING MECHANISM AND IMAGE PICKUP DEVICE THEREOF

CROSS-REFERENCE TO RELATED APPLICATION

This application claims the benefit of priority to Taiwan Patent Application No. 100143025, filed on Nov. 24, 2011, in the Taiwan Intellectual Property Office, the disclosure of which is incorporated herein in its entirety by reference.

BACKGROUND OF THE INVENTION

1. Field of the Invention

The present invention relates to a barrel driving mechanism and an image pickup device thereof, in particular to the barrel driving mechanism and the image pickup device thereof using special grooves formed on a fixing-barrel and a driving-barrel respectively to achieve a zooming effect of a camera lens.

2. Description of the Related Art

As digital technology advances, the way of recording details of our daily life has been changed accordingly, and digital cameras have become one of the necessary 3C products in our life. The zooming function of a camera allows users to adjust the range of viewing angles from the same position to meet different requirements and overcome different environmental conditions in order to obtain a user's desired viewing angle. Therefore, cameras with an optical zooming lens become a mainstream product in the market and these cameras are developed rapidly. As to the present existing cameras, most zooming methods of a camera lens adopt the design of a groove formed in a driving-barrel, such that a portion of a slanted groove in the groove is provided for moving a moving-barrel in the driving-barrel to achieve the zooming effect of the camera lens.

However, the length of the slanted groove of the driving-barrel becomes greater as the amplification increases. Therefore, the length of the driving-barrel is also increased accordingly. When the camera lens is contracted completely, the maximum length of the lens barrel is defined as the final length of the camera lens when it is completely contracted. If the length of the driving-barrel is increased, the final length of the camera lens of the camera is also increased after the camera lens is contracted completely, due to the shape and length of the driving-barrel. However, most designs of the cameras tend to accommodate the camera lens into the camera when the lens is contracted completely. The increased length of the camera after the camera lens is contracted will increase the thickness of the camera. Obviously, such design of simply arranging the groove in the driving-barrel is unfavorable for the design of a compact product and constitutes an obstacle to the miniaturization of the product.

In view of the shortcomings of the prior art, the inventor of the present invention designed a barrel driving mechanism and an image pickup device thereof to overcome the shortcomings of the prior art and enhance the industrial application.

SUMMARY OF THE INVENTION

Therefore, it is a primary objective of the present invention to provide a barrel driving mechanism and an image pickup device thereof to overcome the problem of having an increased length after a conventional lens is contracted, since a groove is formed on a driving-barrel.

To achieve the aforementioned objective, the present invention provides a barrel driving mechanism, comprising: a fixing-barrel, a driving-barrel and a moving-barrel. The fixing-barrel is a hollow barrel-shaped structure having a first groove formed on an internal wall of the fixing-barrel. The first groove has a first stop-position and a first position, and a slanted groove extends from a first stop-position to a first position. The driving-barrel is a hollow barrel-shaped structure disposed in the fixing-barrel and has a second groove formed on an internal wall of the driving-barrel. The second groove has a second stop-position and a second position, and a slanted groove extends from the second stop-position to the second position. The driving-barrel has a first guiding protrusion formed on an external wall of the driving-barrel and inserted into the first groove. When the driving-barrel is rotated, the driving-barrel is moved a first axial distance. The moving-barrel is a hollow barrel-shaped structure disposed in the driving-barrel and has a second guiding protrusion formed on an external wall of the moving-barrel and inserted into the second groove. When the driving-barrel is rotated, the moving-barrel is moved a second axial distance, and the total displacement of the moving-barrel is the sum of the first axial distance and the second axial distance.

Wherein, the groove at the first position and the second position may linear in shape, and perpendicular to an optical axis.

Wherein, the displacement of the first axial distance plus the second axial distance may be equal to the displacement of a first-stage focusing of the barrel driving mechanism.

Wherein, the first guiding protrusion of the driving-barrel is moved along the shape of the first groove of the fixing-barrel when the driving-barrel is rotated.

Wherein, the first groove of the fixing-barrel further may have a third position, and a part of the first groove between the first position and the third position is a first slanted groove, and the second groove of the driving-barrel further comprises a fourth position, and a part of the second groove between the second position and the fourth position is a second slanted groove.

Wherein, when the driving-barrel is rotated, the first guiding protrusion of the driving-barrel is moved a third axial distance along the first slanted groove extending from the first position to the third position, and the second guiding protrusion of the moving-barrel is moved a fourth axial distance along the second slanted groove extending from the second position to the fourth position, and the total displacement of the moving-barrel is equal to the sum of the third axial distance and the fourth axial distance.

Wherein, the displacement of the third axial distance plus the fourth axial distance is equal to the displacement of a second-stage focusing of the barrel driving mechanism.

To achieve the aforementioned objective, the present invention further provides an image pickup device comprising an image sensor, a barrel driving mechanism and a focusing lens group. The image sensor is installed inside the image pickup device for sensing a light of an image of an object to be photographed to form the image of the object to be photographed. The barrel driving mechanism comprises a fixing-barrel, a driving-barrel and a moving-barrel. The fixing-barrel is a hollow barrel-shaped structure having a first groove formed on an internal wall of the fixing-barrel, and the first groove has a first stop-position and a first position, and a section from the first stop-position to the first position is a slanted groove. The driving-barrel is a hollow barrel-shaped structure disposed in the fixing-barrel and having a second groove formed on an internal wall of the driving-barrel, and the second groove has a second stop-position and a second position, and a section from the second stop-position to the second position is a slanted groove, and a first guiding protrusion is formed on an external wall of the driving-barrel and inserted into the first groove, such that when the driving-barrel is rotated, the driving-barrel is moved a first axial distance.

The moving-barrel is a hollow barrel-shaped structure disposed in the driving-barrel and having a second guiding protrusion formed on an external wall of the moving-barrel and inserted into the second groove, such that when the driving-barrel is rotated, the moving-barrel is moved a second axial distance, and the total displacement of the moving-barrel is equal to the sum of the first axial distance and the second axial distance. The focusing lens group is installed between the moving-barrel and the image sensor.

Wherein, the displacement of the first axial distance plus the second axial distance may be a displacement of a first-stage focusing of the barrel driving mechanism.

Wherein, when the driving-barrel is rotated, the first guiding protrusion of the driving-barrel may be moved along the shape of the first groove of the fixing-barrel.

Wherein, when the driving-barrel is rotated, the second guiding protrusion of the moving-barrel may be moved along the shape of the second groove of the driving-barrel.

Wherein, the first groove of the fixing-barrel further may have a third position, and a part of the first groove between the first position and the third position is a first slanted groove, and the second groove of the driving-barrel may further comprise a fourth position, and a part of second groove between the second position to the fourth position is a second slanted groove.

Wherein, when the driving-barrel is rotated, the first guiding protrusion of the driving-barrel may be moved a third axial distance from a the first position to the third position along the first slanted groove, and the second guiding protrusion of the moving-barrel may be moved a fourth axial distance from the second position to the fourth position along the second slanted groove, and the total displacement of the moving-barrel is the sum of the third axial distance and the fourth axial distance.

Wherein, the displacement of the third axial distance plus the fourth axial distance is a displacement of a second-stage focusing of the barrel driving mechanism.

In summation, the barrel driving mechanism and the image pickup device thereof in accordance with the present invention have one or more of the following advantages:

(1) The barrel driving mechanism and the image pickup device have the fixing-barrel installed in the first groove and the driving-barrel installed in the second groove to drive the driving-barrel and the moving-barrel to move axially, and the total displacement of the moving-barrel is the displacement of the driving-barrel plus the displacement of the moving-barrel. The slanted grooves required for the displacement of the moving-barrel can be distributed to the fixing-barrel and the driving-barrel installed of being concentrated on one of the lens barrels, so that the lengths of the fixing-barrel, the driving-barrel and the moving-barrel can be even to reduce the length after the lens is contacted, so as to improve the product competitiveness.

(2) The barrel driving mechanism and the image pickup device have the fixing-barrel installed in the first groove and the driving-barrel installed in the second groove to reduce the length after the camera lens is contracted, so as to reduce the space required for the product and miniaturize the image pickup device.

DESCRIPTION OF THE PREFERRED EMBODIMENTS

The technical characteristics of the present invention will become clear with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention.

The barrel driving mechanism of the present invention mainly has special grooves formed on a fixing-barrel and a driving-barrel respectively for achieving the zooming effect, and the barrel driving mechanism is applicable for an image pickup device such as a digital camera, a Smart phone, and a digital single-lens reflex camera or a lens of a replaceable lens type camera, but the scope of the present invention is not limited to these devices only.

Figure 1:
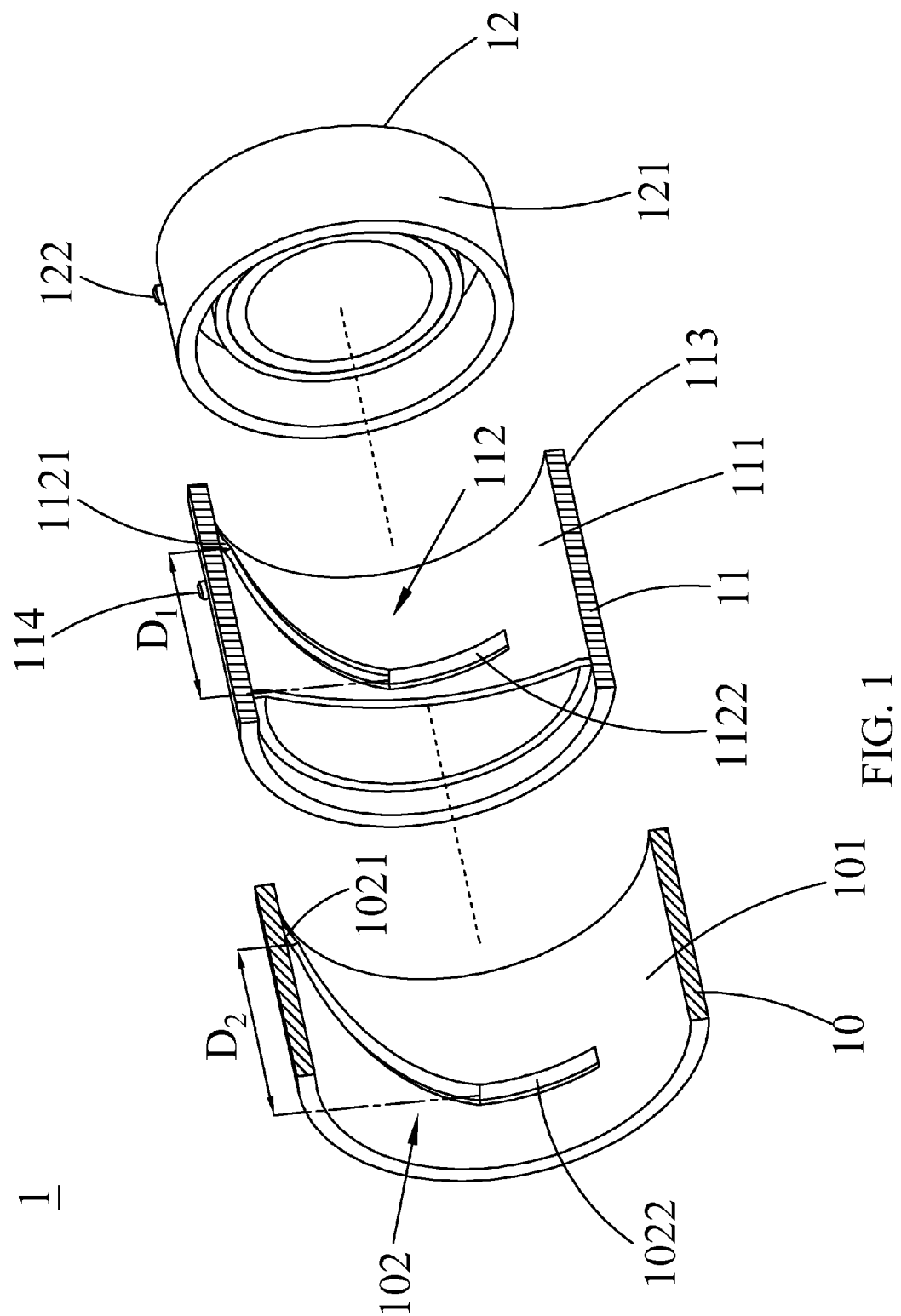
FIG. 1 is an exploded view of the barrel driving mechanism of the present invention.
Figure 2:
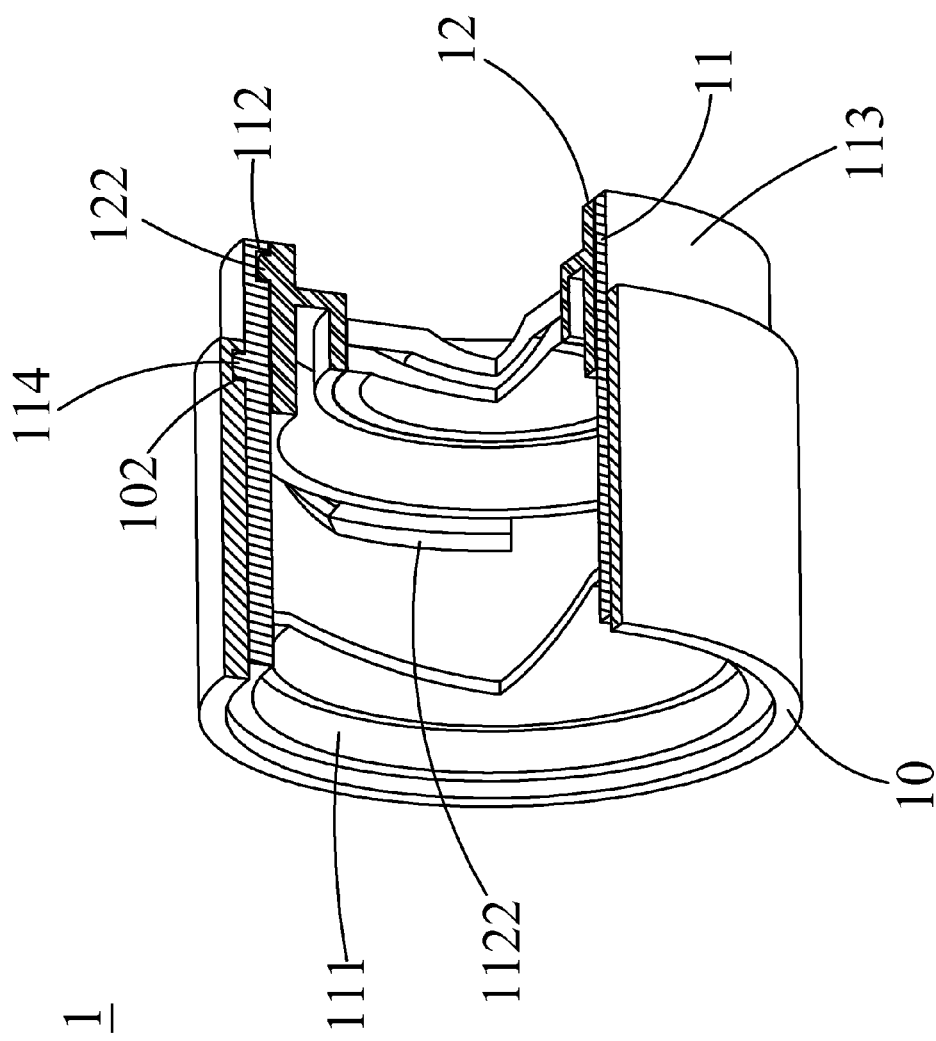
FIG. 2 is an assembly drawing of the barrel driving mechanism of the present invention.

With reference to FIGS. 1 and 2 for an exploded view and an assembly drawing of the barrel driving mechanism of the present invention respectively, the barrel driving mechanism 1 comprises a fixing-barrel 10, a driving-barrel 11 and a moving-barrel 12. Wherein, the fixing-barrel 10 is a hollow barrel-shaped structure having a first groove 102 formed on an internal wall 101 of the fixing-barrel 10, and the first groove 102 has a first stop-position 1021 and a first position 1022, and a slanted groove extending from the first stop-position 1021 to the first position 1022. The driving-barrel 11 is a hollow barrel-shaped structure disposed in the fixing-barrel 10 and having a second groove 112 formed on an internal wall 111 of the driving-barrel 11. The second groove 112 has a second stop-position 1121 and a second position 1122, and a slanted groove extending from the second stop-position 1121 to the second position 1122. The driving-barrel 11 has a first guiding protrusion 114 formed on an external wall 113 of the driving-barrel 11 and inserted into the first groove 102. When the driving-barrel 11 is rotated, the first guiding protrusion 114 is dragged by the shape from the first stop-position 1021 of the first groove 102 to the first position 1022, such that the driving-barrel 11 is moved axially a first axial distance D1. The moving-barrel 12 is a hollow barrel-shaped structure disposed in the driving-barrel 11 and has a second guiding protrusion 122 formed on an external wall 121 of the moving-barrel 12 and inserted into the second groove 112. When the driving-barrel 11 is rotated, the second guiding protrusion 122 is dragged by the shape from the second stop-position 1121 of the second groove 112 to the second position 1122 to drive the moving-barrel 12 to move axially a second axial distance D2.

Figure 3:
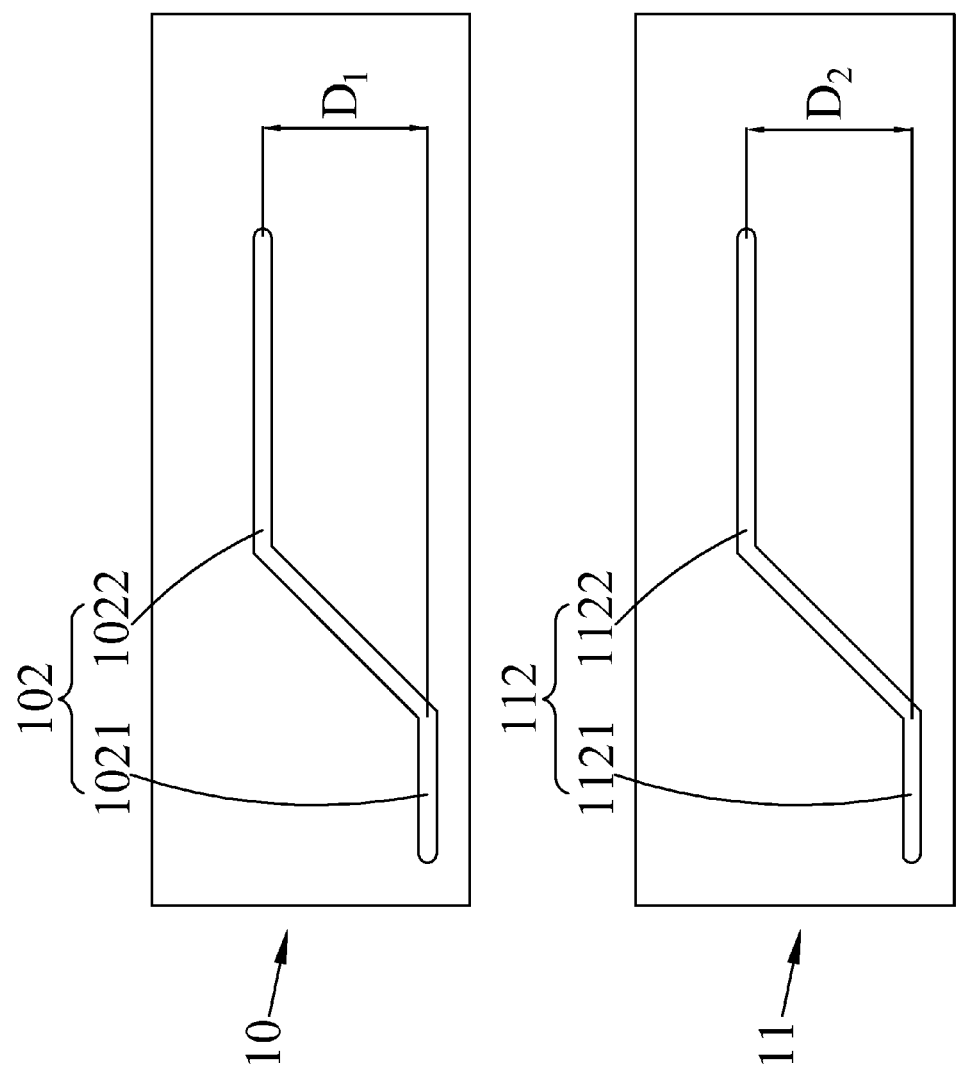
FIG. 3 is a schematic view of the grooves of the barrel driving mechanism of the present invention.

With reference to FIG. 3 for a schematic view of the grooves of the barrel driving mechanism of the present invention, the driving-barrel 11 is moved axially a first axial distance D1 in the fixing-barrel 10, and the moving-barrel 12 is installed in the driving-barrel 11, such that while the driving-barrel 11 is moved a first axial distance D1, the moving-barrel 12 is moved the first axial distance D1. When the driving-barrel 11 is rotated, the moving-barrel 12 is moved a second axial distance D2. Therefore, the total displacement of the moving-barrel 12 with respect to the fixing-barrel 10 is equal to the sum of the first axial distance D1 and the second axial distance D2. The grooves at the first position 1022 and the second position 1122 are linear grooves perpendicular to an optical axis. With the linear grooves, the fixing-barrel 11 and the moving-barrel 12 do not have any axial displacement, and the focusing module (not shown in the figure) of the barrel driving mechanism 1 can perform the focusing operation by the linear groove. In other words, the total displacement (which is the sum of the first axial distance D1 and the second axial distance D2) of the moving-barrel 12 is the displacement of a first-time focusing of the barrel driving mechanism 1.

Figure 4:
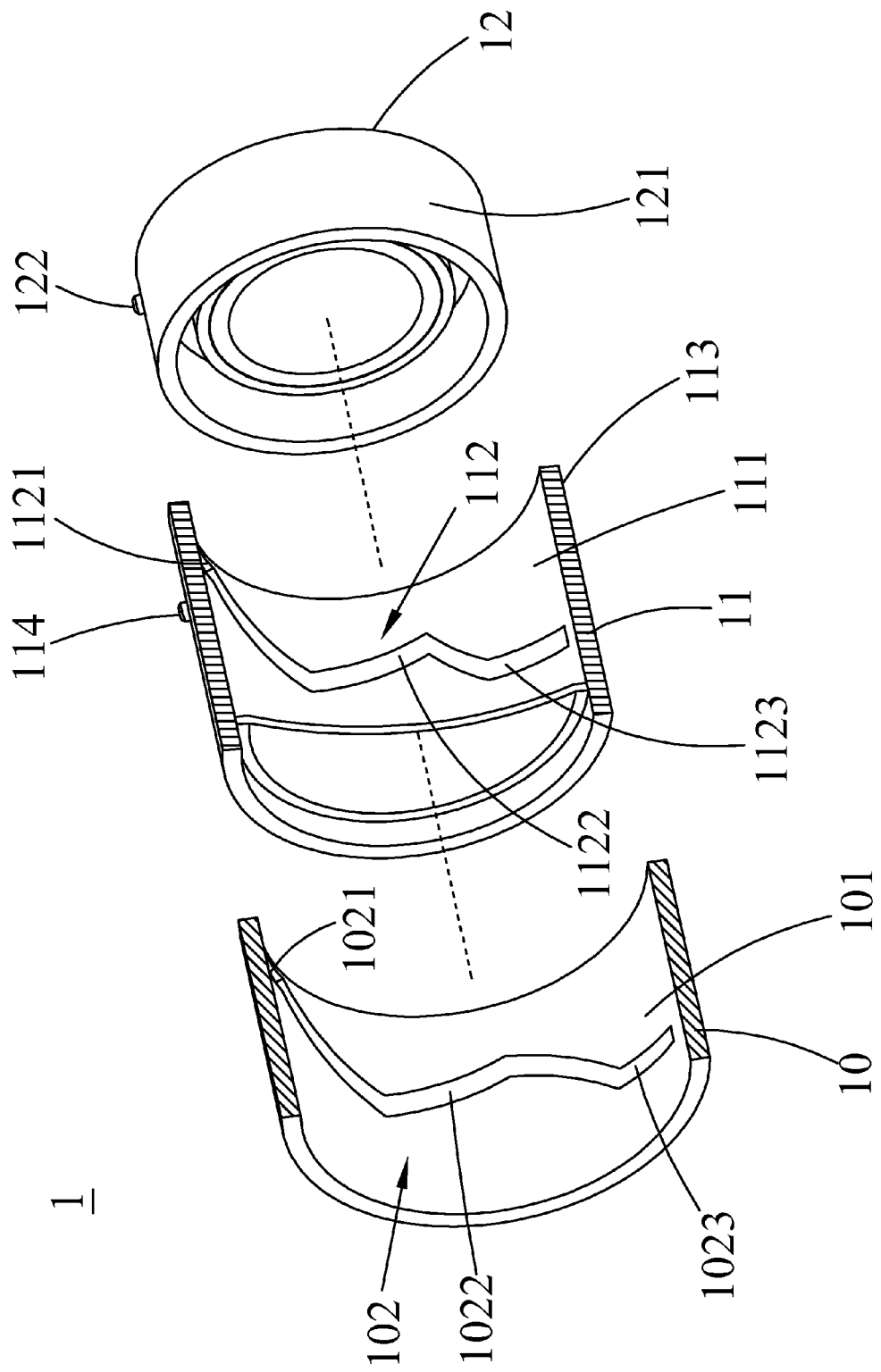
FIG. 4 is an exploded view of a barrel driving mechanism in accordance with a first preferred embodiment of the present invention.
Figure 5:
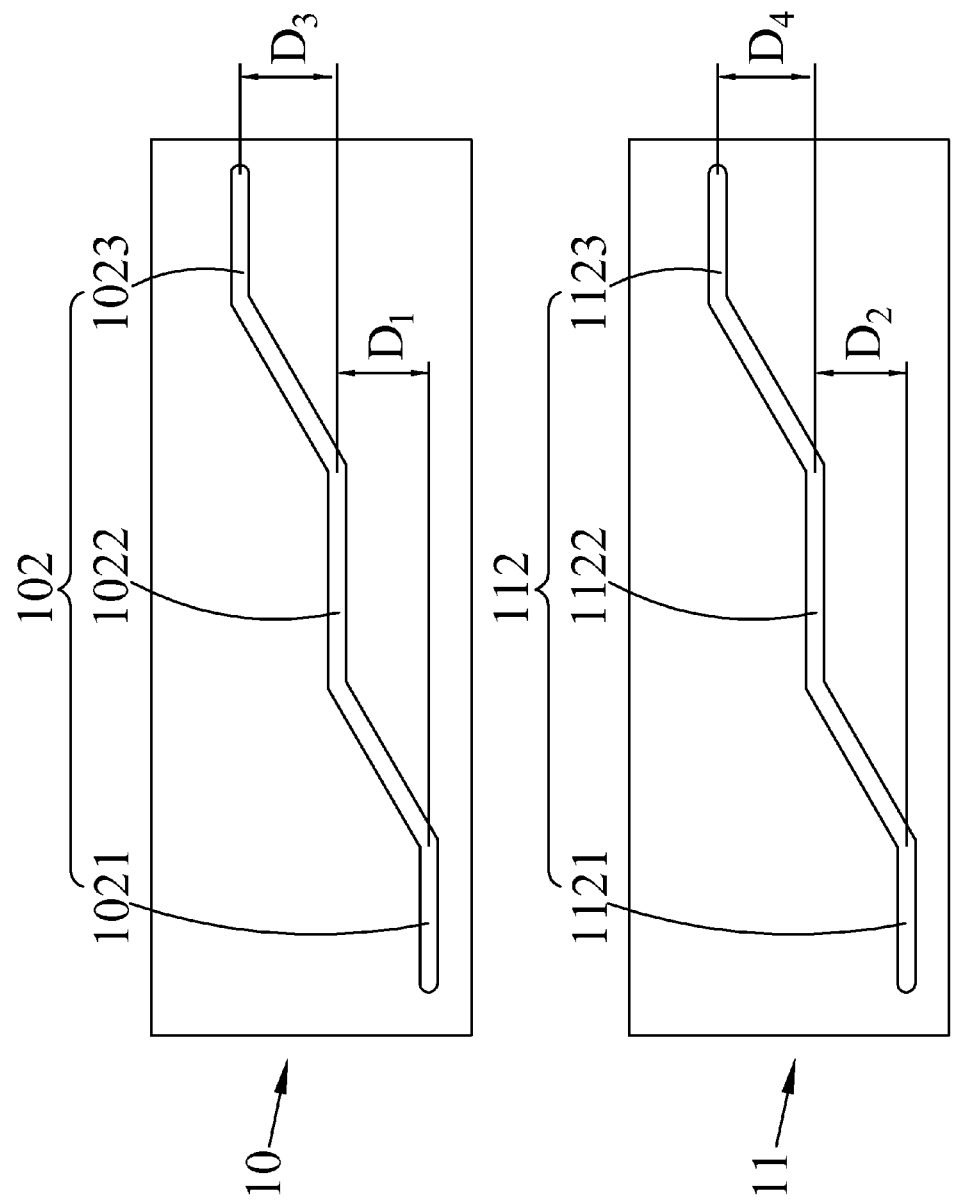
FIG. 5 is a schematic view of the grooves of the barrel driving mechanism in accordance with the first preferred embodiment of the present invention.

With reference to FIGS. 4 and 5 for an exploded view of a barrel driving mechanism and a schematic view of the grooves of the barrel driving mechanism in accordance with the first preferred embodiment of the present invention respectively, the connection and operation of the barrel driving mechanism 1 are the same as those described above and will not be described again. Wherein, the first groove 101 of the fixing-barrel 10 further comprises a third position 1023, and a part of the first groove between the first position 1022 and the third position 1023 is a first slanted groove. The second groove 112 of the driving-barrel 11 further comprises a fourth position 1123, and a part of the second groove between the second position 1122 and the fourth position 1123 is a second slanted groove. When the driving-barrel 11 is rotated, the first guiding protrusion 114 of the driving-barrel 11 can be moved in the linear groove from the first position 1022 and then moved a third axial distance D3 along the first slanted groove to the third position 1023. Similarly, the second guiding protrusion 122 of the moving-barrel 12 can be moved in a linear groove from the second position 1122 and then moved a fourth axial distance D4 along the second slanted groove to the fourth position 1123. Wherein, the quantity of the first guiding protrusions 114 or the second guiding protrusions 122 is equal to the quantity of the first grooves 102 or the second grooves 112, and the quantity can be changed according to the actual requirements. For example, more first guiding protrusions 114 or second guiding protrusions 122 (such as two or three) can be used in a larger space, such that when the driving-barrel 11 or the moving-barrel 12 is moved axially, a more stable movement can be achieve. However, the invention is not limited to such arrangements only.

As described above, the driving-barrel 11 is moved a third axial distance D3 with respect to the fixing-barrel 10, and the moving-barrel 12 disposed in the driving-barrel 11 is moved a fourth axial distance D4 with respect to the driving-barrel 11. Therefore, the displacement of the moving-barrel is equal to the sum of the third axial distance D3 and the fourth axial distance D4. In addition, the groove at the third position 1023 of the first groove 102 and the groove at the fourth stop-position 1123 of the second groove 112 is linear in shape and perpendicular to an optical axis, which prevent the driving-barrel 11 and the moving-barrel 12 from being moved axially to facilitate a focusing module of the barrel driving mechanism 1 to perform the focusing operation at the linear groove. In other words, the sum of the third axial distance D3 and the fourth axial distance D4 is equal to the displacement of another-time focusing of the barrel driving mechanism 1.

Overall speaking, the shape of the first groove 102 or the second groove 112 is a linear groove (extending from the first stop-position 1021 to the second stop-position 1121) connected to a slanted groove, and then connected to another linear groove (extending from the first position 1022 to the second position 1122), and then connected to another slanted groove, and then connected to another linear groove (extending from the third position 1023 to the fourth position 1123). More specifically, in the barrel driving mechanism 1, the displacement through the first axial distance D1 of the moving-barrel 12 plus the second axial distance D2 can be the displacement of the first-stage focusing of the barrel driving mechanism 1, and the displacement through the third axial distance D3 plus the fourth axial distance D4 can be the displacement of second-stage focusing of the barrel driving mechanism 1, such that the barrel driving mechanism 1 is a zooming lens with a two-stage zooming function. To obtain a zooming lens with a three-stage zooming function, the barrel driving mechanism 1 can have a slanted groove formed behind the third position 1023 and connected to a fifth position (not shown in the figure), and similarly a slanted groove is formed behind the fourth position 1123 and connected to a sixth position (not shown in the figure) to achieve the effect of having the three-stage zooming function.

Figure 6:
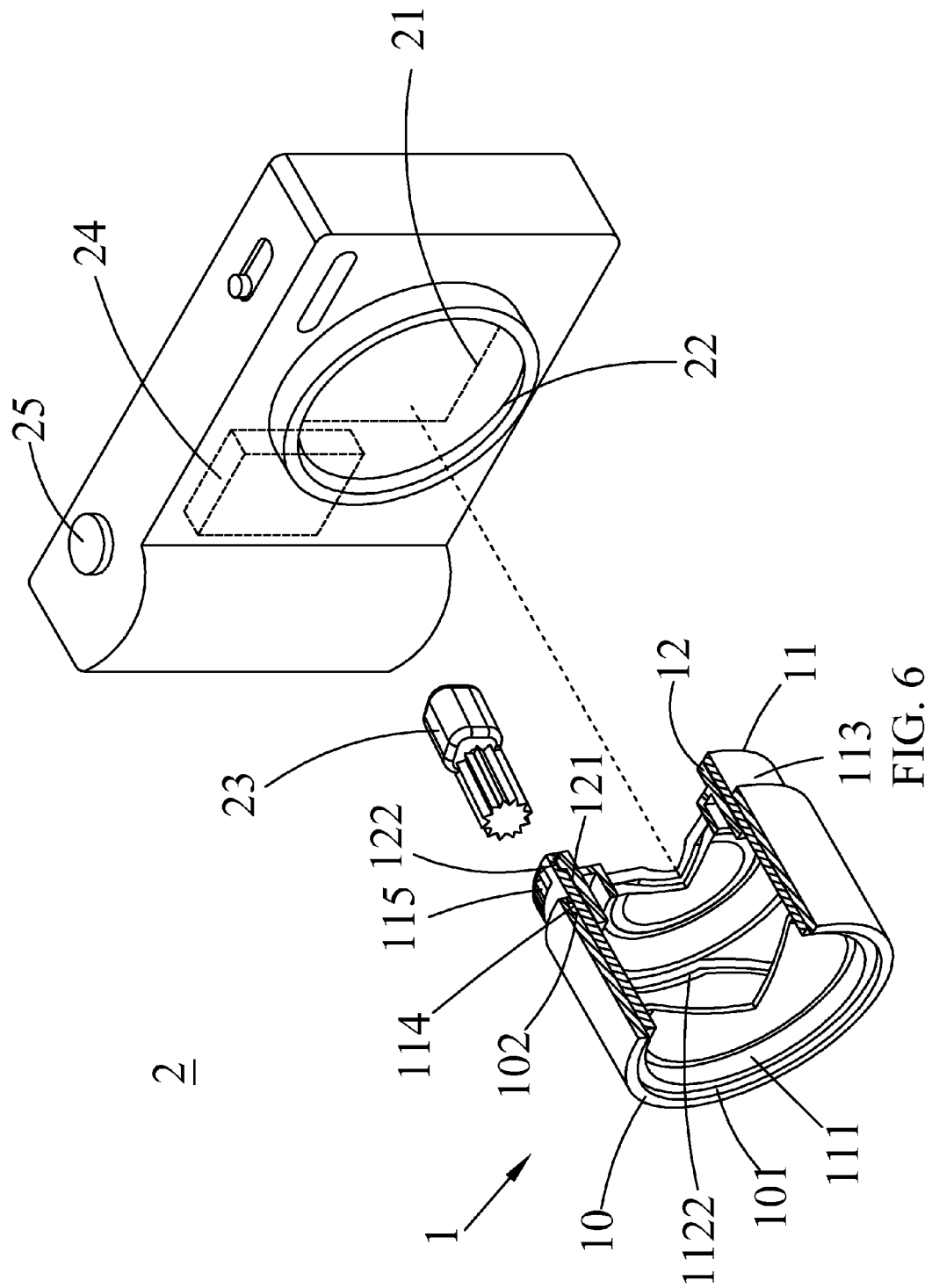
FIG. 6 is a schematic view of the barrel driving mechanism in accordance with a second preferred embodiment of the present invention.

With reference to FIG. 6 for a schematic view of a barrel driving mechanism in accordance with the second preferred embodiment of the present invention, the barrel driving mechanism 1 is applicable for an image pickup device 2. The image pickup device 2 includes an image sensor 21, a barrel driving mechanism 1, a focusing lens group 22 and a driving module 23. In this preferred embodiment, the connection and operation of the barrel driving mechanism 1 are the same as those described above, and thus will not be described again. Wherein, the image sensor 21 can be a charge coupled device (CCD) or complementary metal oxide semiconductor (CMOS) sensor for sensing the light of an image of an object to be photographed to form an image of the object to be photographed. The image sensor 21 is installed inside the image pickup device 2. The focusing lens group 22 is installed between the moving-barrel 12 and the image sensor 21. The driving module 23 can be installed inside the barrel driving mechanism 1 or the image pickup device 2. In this preferred embodiment, the driving module 23 is installed inside the barrel driving mechanism 1, but the scope of the invention is not limited to such arrangement only.

Wherein, the driving-barrel 11 of the barrel driving mechanism 1 has a driving part 115 coupled to the driving module 23, such that the driving module 23 can drive the driving-barrel 11 by the driving part 115 to move and rotate. When a user presses a zooming button (not shown in the figure) or a power button (not shown in the figure) of the image pickup device 2, a control module 24 installed in the image pickup device 2 controls the driving module 23 to drive the driving-barrel 11 to move and rotate, and the first guiding protrusion 114 is dragged by the shape of a groove extending from the first stop-position 1121 of the first groove 112 to the second position 1122, and the second guiding protrusion 122 is dragged by the shape of a groove extending from the second stop-position 1121 of the second groove 112 to the second position 1122. Thus, the moving-barrel 12 is moved a displacement equal to the sum of a first axial distance D1 and a second axial distance D2, and the moving-barrel 12 is changed from the contracted state to a status away from the image sensor 21, so as to complete a zooming of the image pickup device 2 from a wide-angle end. When the image pickup device 2 completes the zooming at the wide-angle end, the distance between a zooming lens group (not shown in the figure) installed in the barrel driving mechanism 1 and the image sensor 21 is adjusted appropriately, so that the image sensor 21 can cover a range of a wider viewing angle. Now, the user can press a shutter button 25 to adjust the focusing lens group 22 to an appropriate focusing condition and an image can be received by the image sensor 21.

If the user further presses a zooming button of the image pickup device 2, the driving module 23 continues to drive the driving-barrel 11 to move and rotate, so that the first guiding protrusion 114 of the driving-barrel is dragged by the shape of the first groove 102 to move from the first position 1022 to the second position 1023, and the driving-barrel 11 is further moved a third axial distance D3. Similarly, the second guiding protrusion 122 of the moving-barrel 12 is dragged by the shape of the second groove 112 to move from the second position 1122 to the fourth position 1123, so that the moving-barrel 12 is moved a fourth axial distance D4, and the moving-barrel 12 will be situated farther from the image sensor 21, so as to complete the zooming of the image pickup device 2 at a telescopic end. Now, the displacement of the moving-barrel 12 with respect to the image sensor 21 is equal to the sum that the first axial distance D1 is accumulated to the fourth axial distance D4. The focusing operation has been described above, and thus will not be described again. However, the displacement of the moving-barrel 12 used for completing the operation at a wide-angle end or a telescopic end is provided for illustrating the invention, but they can be changed according to the actual layout of the optical lenses. For example, if the moving-barrel 12 is situated farthest away from the image sensor 21, an operation at the wide-angle end is achieved, and if the moving-barrel 12 is situated closest to the image sensor 21, an operation at a telescopic end is achieved.

In summation of the description above, the slanted groove provided for producing the expected displacement is formed at a lens barrel (such as the driving-barrel) directly, the length of the lens barrel will be increased accordingly, so that when the camera lens is contracted completely, the final length will be restricted by the length of the lens barrel. If the whole lens barrel is contracted into the fixing-barrel, and the length of the driving-barrel is greater than the length of the fixing-barrel, then it is necessary to increase the length of the fixing-barrel to the same length of the driving-barrel before the camera lens can be contracted completely. The barrel driving mechanism and the image pickup device of the invention have the fixing-barrel installed in the first groove and the driving-barrel installed in the second groove, and use the first guiding protrusion on the driving-barrel and the second guiding protrusion on the moving-barrel to limit the movement and produce axial movements, so that the slanted grooves required for the displacement of the moving-barrel can be distributed onto the fixing-barrel and the driving-barrel instead of being concentrated on one of the lens barrels only, so that the lengths of the fixing-barrel, the driving-barrel and the moving-barrel can be even and the length of each lens barrel can be reduced, and after the camera lens is contracted, the length can be reduced in order to enhance the product competitiveness. Similarly, the barrel driving mechanism with a reduced length can be applied in an image pickup device to reduce the space required by the product and miniaturize the image pickup device.

What is claimed is:

1. A barrel driving mechanism, comprising:
    a fixing-barrel, being a hollow barrel-shaped structure, and having a first groove formed on an internal wall of the fixing-barrel, and the first groove having a first stop-position, a first position, and a third position, and a slanted groove extending from the first stop-position to the first position, wherein the fixing-barrel is fixed and a part of the first groove between the first position and the third position is a first slanted groove;
    a driving-barrel, being a hollow barrel-shaped structure, and installed in the fixing-barrel, and having a second groove formed on an internal wall of the driving-barrel, and the second groove having a second stop-position, a second position, and a fourth position, and a slanted groove extending from the second stop-position to the second position, and having a first guiding protrusion formed on an external wall and inserted into the first groove, such that when the driving-barrel is rotated, the driving-barrel moves a first axial distance, wherein a part of the second groove between the second position and the fourth position is a second slanted groove; and
    a moving-barrel, being a hollow barrel-shaped structure, installed in the driving-barrel, and having a second guiding protrusion formed on an external wall of the moving-barrel and inserted into the second groove, such that when the driving-barrel is rotated, the moving-barrel moves a second axial distance, and a total displacement of the moving-barrel being equal to a sum of the first axial distance and the second axial distance;
    wherein when the driving-barrel is rotated, the first guiding protrusion of the driving-barrel is moved a third axial distance along the first slanted groove extending from the first position to the third position, and the second guiding protrusion of the moving-barrel is moved a fourth axial distance along the second slanted groove extending from the second position to the fourth position, and the total displacement of the moving-barrel is equal to the sum of the third axial distance and the fourth axial distance, and the sum of the third axial distance and the fourth axial distance is equal to the displacement of a second-stage focusing of the barrel driving mechanism.

2. The barrel driving mechanism of claim 1, wherein a part of the first groove at the first position and a part of the second position at the second position are linear in shape, and are perpendicular to an optical axis.

3. The barrel driving mechanism of claim 1, wherein a sum of the first axial distance and the second axial distance is equal to the displacement of a first-stage focusing of the barrel driving mechanism.

4. The barrel driving mechanism of claim 1, wherein the first guiding protrusion of the driving-barrel is moved along the first groove of the fixing-barrel when the driving-barrel is rotated.

5. The barrel driving mechanism of claim 1, wherein the second guiding protrusion of the moving-barrel is moved along t the second groove of the driving-barrel when the driving-barrel is rotated.

6. An image pickup device, comprising:
    an image sensor, installed inside the image pickup device;
    a barrel driving mechanism, comprising:
    a fixing-barrel, being a hollow barrel-shaped structure, and having a first groove formed on an internal wall of the fixing-barrel, and the first groove having a first stop-position, a first position, and a third position, and a slanted groove extending from the first stop-position to the first position, wherein the fixing-barrel is fixed onto the image pickup device and a part of the first groove between the first position and the third position is a first slanted groove;
    a driving-barrel, being a hollow barrel-shaped structure, disposed in the fixing-barrel, and having a second groove formed on an internal wall of the driving-barrel, and the second groove having a second stop-position, a second position, and a fourth position, and a slanted groove extending from the second stop-position to the second position, and having a first guiding protrusion formed on an external wall of the driving-barrel and inserted into the first groove, such that when the driving-barrel is rotated, the driving-barrel is moved a first axial distance, wherein a part of the second groove between the second position and the fourth position is a second slanted groove; and a moving-barrel, being a hollow barrel-shaped structure, disposed in the driving-barrel, and having a second guiding protrusion formed on an external wall of the moving-barrel and inserted into the second groove, such that when the driving-barrel is rotated, the moving-barrel is moved a second axial distance, and the total displacement of the moving-barrel is equal to the sum of the first axial distance and the second axial distance; and a focusing lens group, installed between the moving-barrel and the image sensor;

wherein when the driving-barrel is rotated, the first guiding protrusion of the driving-barrel is moved a third axial distance from a the first position to the third position along the first slanted groove, and the second guiding protrusion of the moving-barrel is moved a fourth axial distance from the second position to the fourth position along the second slanted groove, and the total displacement of the moving-barrel is the sum of the third axial distance and the fourth axial distance, and the displacement of the third axial distance plus the fourth axial distance is a displacement of a second-stage focusing of the barrel driving mechanism.

7. The image pickup device of claim 6, wherein the grooves at the first position and the second position are linear in shape, and are perpendicular to an optical axis.

8. The image pickup device of claim 6, wherein the displacement of the first axial distance plus the second axial distance is a displacement of a first-stage focusing of the barrel driving mechanism.

9. The image pickup device of claim 6, wherein when the driving-barrel is rotated, the first guiding protrusion of the driving-barrel is moved along the shape of the first groove of the fixing-barrel.

10. The image pickup device of claim 6, wherein when the driving-barrel is rotated, the second guiding protrusion of the moving-barrel is moved along the shape of the second groove of the driving-barrel.

* * * * *